United States Patent [19]

Smith, Jr.

[11] Patent Number: 4,492,863
[45] Date of Patent: Jan. 8, 1985

[54] DETERMINING ELEMENTAL CONCENTRATIONS AND FORMATION MATRIX TYPE FROM NATURAL GAMMA RAY SPECTRAL LOGS

[75] Inventor: Harry D. Smith, Jr., Houston, Tex.

[73] Assignee: Halliburton Company, Duncan, Okla.

[21] Appl. No.: 432,203

[22] Filed: Oct. 1, 1982

[51] Int. Cl.³ ............................................. G01V 5/00
[52] U.S. Cl. .................................... 250/256; 250/262
[58] Field of Search ............ 250/253, 256, 262, 361 R

[56]         References Cited
         U.S. PATENT DOCUMENTS 3,940,610  2/1976  Dennis et al. ........................ 250/262
3,976,878  8/1976  Chevalier et al. ................... 250/262
4,187,908  2/1980  Fertl et al. ......................... 250/256
4,271,356  6/1981  Groeschel et al. .................. 250/262
4,436,996  3/1984  Arnold et al. ....................... 250/256

Primary Examiner—Janice A. Howell
Attorney, Agent, or Firm—William J. Beard

[57]           ABSTRACT

Natural gamma radiation is detected by a scintillation detector in a well logging sonde and separated into at least six separate energy regions. The gamma ray counts in the higher four energy regions are used to derive borehole compensated elemental concentrations of potassium, uranium and thorium. The gamma ray counts lower two energy regions are used to identify formation lithology.

14 Claims, 7 Drawing Figures

DETERMINING ELEMENTAL CONCENTRATIONS AND FORMATION MATRIX TYPE FROM NATURAL GAMMA RAY SPECTRAL LOGS

FIELD OF THE INVENTION

The present invention is concerned with detecting the naturally occurring gamma radiation from the earth formations penetrated by a well borehole. More specifically, the invention concerns methods and apparatus for detecting gamma radiation and measuring the gamma ray count rate in defined energy ranges. The naturally emitted gamma rays enable determination of relative concentrations of potassium, uranium and thorium in the earth formations surrounding a well borehole. The penetration of the gamma ray photons is a function of earth formation matrix type. The gamma ray count rates in the selected energy windows are isolated to define a factor expressive of formation matrix type.

BACKGROUND OF THE INVENTION

Naturally occurring gamma radiation for K-U-T (potassium, uranium and thorium) elements yields gamma ray intensity vs. energy spectra in the vicinity of a well borehole observed by highly stable scintillation detectors in the well borehole. The radiation at the scintillation detector and its associated photomultiplier produces a pulse height spectrum proportional to the energy of gamma rays impinging on the scintillation crystal. The spectrum is divided into selected energy ranges or windows. Three windows are centered about selected gamma ray emission peaks for the naturally occurring gamma rays of the K-U-T elements. Gamma ray count rates in each of the three energy ranges are transmitted to the surface and processed by a technique known as spectrum stripping wherein standard calibration spectra, for each of the individual elements (obtained in standard boreholes) are applied to the unprocessed data (count rates) of the selected windows (energy ranges) to detect each of the three elements of interest. The "stripping constants" are derived from measurements of the standard gamma ray energy spectra in standard boreholes containing essentially only one of the three elements to enable the stripping constants to be applied to the measured spectrum in an unknown earth formation surrounding a borehole. The concentrations of the three elements of interest are determined after application of the stripping constants. After carrying out specified procedures, elemental concentrations of the K-U-T elements are obtained. A fourth window is used to compensate the K-U-T concentrations for borehole effects, as described in U.S. patent application filed May 21, 1981, Ser. No. 265,736 now U.S. Pat. No. 4,436,996. Fifth and sixth windows in the observed spectrum are processed to isolate a factor indicative of formation matrix type.

The actual gamma ray count rate achieved at a scintillation detector in a well borehole is dependent on the Compton attenuation coefficient $\eta$. Each photon has a point of origination somewhere in the adjacent earth formations in traveling toward the scintillation detector. The attenuation of the gamma ray photon flux along the path of travel is dependent on the thickness of the material, the density of the material and the formation matrix type of the material. The gamma ray photons travel along a path having a length which is statistically determined from the distributed emission sources, namely the K-U-T elements. The present invention provides a measurement of formation matrix type of an adjacent formation by utilization of the measured natural gamma ray spectrum observed at a scintillation crystal coupled with signal processing procedures as described below.

Major attenuation factors of the gamma ray flux include pair production, Compton scattering, and photoelectric absorption. Below certain energy levels, pair production is negligible and, therefore, not significantly involved in the method described herein.

The observed or measured gamma ray energy spectra are thus separated into six energy level windows. The location of the six energy windows in the observed gamma ray spectrum is important. There are three predominant energy peaks for the K-U-T elements, and windows are normally defined to observe the peaks. The K-U-T peaks are 1.46, 1.76 and 2.61 MeV gamma radiation peaks for potassium ($K^{40}$), uranium ($Bi^{214}$) and thorium ($Tl^{208}$), respectively. A fourth energy window is defined in the Compton dominated spectrum to compensate for borehole and formation density induced changes in the calculated K-U-T concentrations. The fifth window (which may or may not overlap the fourth window) is sufficiently high in energy range to be above the effects of photoelectric absorption so that the primary mode of photon attenuation is Compton scattering. The sixth window is defined at very low gamma ray energy levels where photoelectric absorption is of major importance and relative attenuation due to pair production or the Compton effect is minimized.

The measured count rates in the fifth and sixth windows can be used to define a ratio which, after isolation of K-U-T elemental concentration effects, is primarily a function of the formation photoelectric absorption cross-section U, and the borehole parameters adjacent to the tool.

BRIEF SUMMARY OF THE DISCLOSURE

This disclosure sets forth methods and apparatus for determining formation matrix type of earth formations adjacent to a well borehole. This is accomplished through measuring the naturally occurring gamma ray energy spectrum attributable to K-U-T elements and through evaluating the spectrum for an indication of formation matrix type.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE INVENTION

Figure 4:
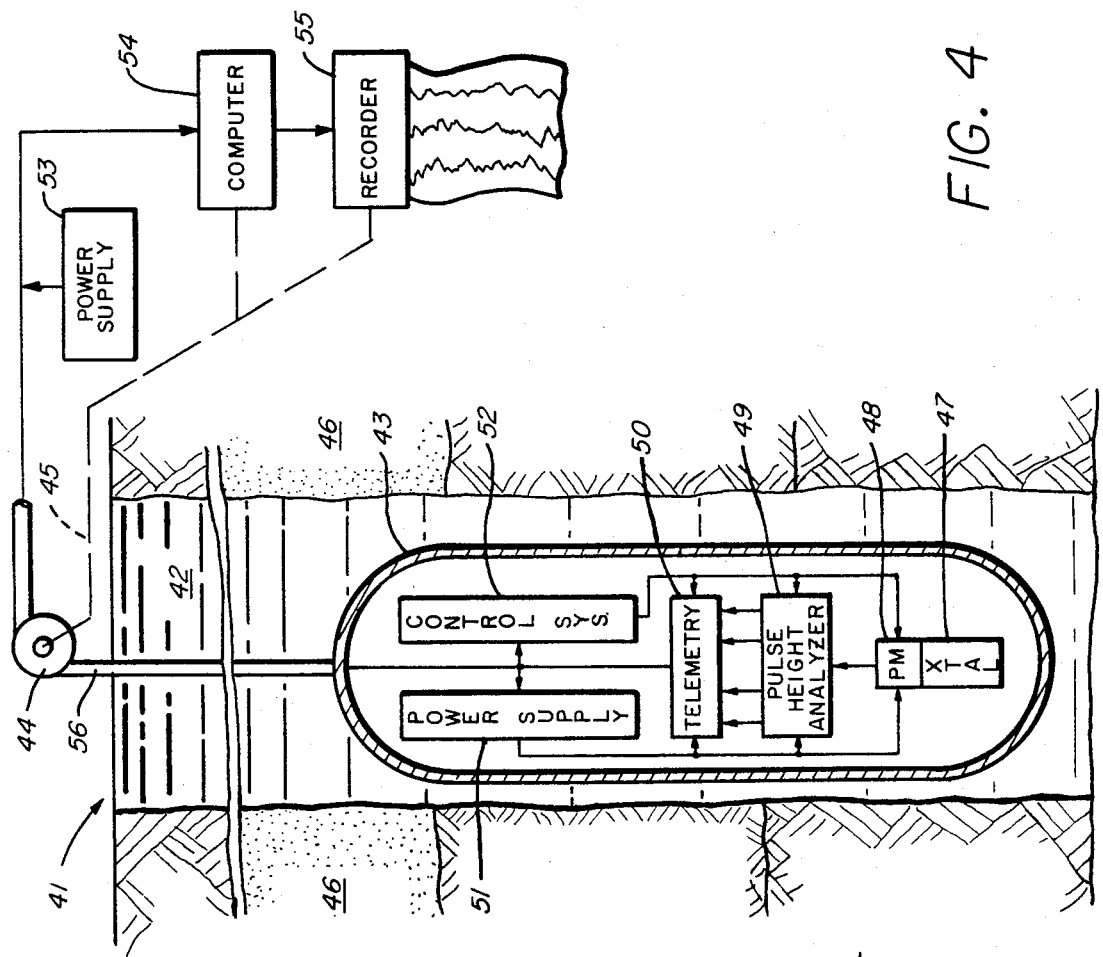
FIG. 4 is a schematic diagram of the well logging system employing the concepts of the present invention.

The present invention is concerned with formation matrix type measurements. Before formation matrix type valuations are discussed, certain preliminary measurements must be described. The preliminary measurements of a naturally occurring gamma ray spectrum defined in selected energy windows are made and elemental concentrations are determined. Gamma ray attenuation due to Compton scattering is determined and density is obtained. Then, photoelectric absorption attenuation is also determined leading to evaluation of formation matrix type.

Logs of natural gamma ray activity in three energy ranges have been used to estimate the potassium (K), uranium (U) and thorium (Th) content of earth formations. These logs (commonly referred to K-U-T logs) were initially used to determine other important information about the earth formations penetrated by a well borehole such as:

(1) the oxidation state of the bed at the time of deposition;

(2) quantity of organic material in sedimentary layers which (together with Item 1) leads to source rock bed identification;

(3) the depositional environment of the bed (i.e. continental vs. marine deposition);

(4) water movement in downhole formations which, in turn, may indicate fractures, faulting or permeability;

(5) water movement in the borehole region which may indicate channeling or water producing perforations;

(6) more accurate shale content determinations for a particular bed and;

(7) clay typing and marker bed identification.

The two commercially available services, responsive to naturally occurring gamma radiation, each use scintillation type gamma ray detectors which are biased to record the gamma radiation in either three or five energy bands or windows. Count rate contributions from the decay of each of the elements of interest; or their daughter decay products are mathematically stripped or fitted from the composite count rates observed within the three or five energy windows. Elemental concentrations may then be computed from the stripped or fitted count rates. In the second type of commercial logging operation for this purpose currently available, the use of five energy windows provides an overdetermined set of relations which may be used to statistically enhance the count rate information from each of the energy windows. Elemental concentrations may then be computed from the stripped or fitted count rates. However, no basic change from a comparison of unknown spectra with standard gamma ray spectra taken under standard borehole conditions is contemplated in either of the commercially available techniques at present. The method of the present invention uses multiple (6) windows for entirely different reasons. This photoelectric method to determine lithology is passive, that is, lacking in a gamma ray source as exemplified in the publication "the Lithodensity Log," SPWLA. 1979 European Symposium by F. Felder & C. BOyeldieu.

Changes in borehole conditions can introduce errors in concentration calculations of the elements that can approach an order of magnitude. Such errors, although large, were tolerable in early applications of the K-U-T log for minerals exploration. However, as the applications of such logs become more sophisticated, errors of this magnitude became unacceptable.

In the present invention, a K-U-T log enhanced with borehole compensation by utilizing the response measured in a fourth energy window. Fifth and sixth energy windows are used in formation matrix type determination. The fourth, or compensation, window monitors the shape of the gamma ray spectrum caused by variations in borehole conditions. The response of the compensation window is then used to correct the response of the count rate in the first three energy windows to some standard borehole and formation geometry. The fifth window measured count rate is used with the sixth window count rate to determine formation matrix type or lithology.

Figure 1:
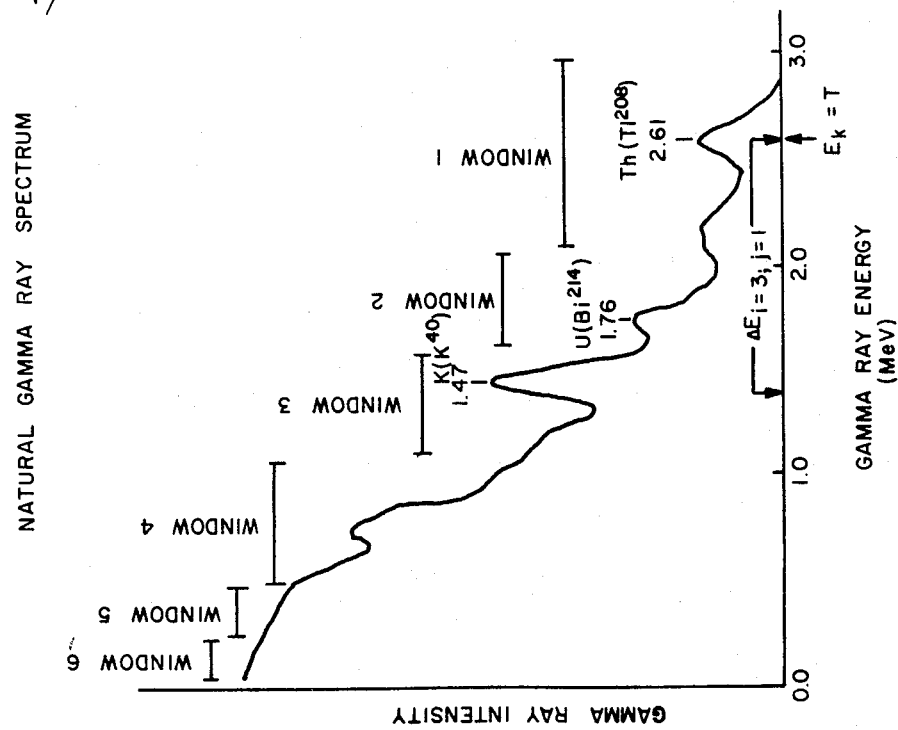
FIG. 1 is a graphical representation illustrating a typical natural gamma ray energy spectrum in a borehole taken with a scintillation detector and showing six approximate energy ranges or "windows" used in the present invention.

Referring now to FIG. 1, a natural gamma ray spectrum is illustrated schematically in which the gamma ray intensity or count rate is plotted as a function of gamma ray energy over the energy range from 0-3 MeV. Six energy windows contemplated for use, according to the present invention, are illustrated superimposed on the gamma ray spectrum of FIG. 1. The fifth and sixth windows will be defined in more detail later. The energy bands or windows labelled window 1, window 2 and window 3 are chosen to include the 2.61, 1.76 and 1.46 MeV gamma radiations from the decay of thorium ($Tl^{208}$), uranium ($Bi^{214}$), and potassium ($K^{40}$). The total count rate recorded in each window may be expressed as given in Equations (1)–(4).

$$C_1 = C_{1,T} \quad (1)$$

$$C_2 = C_{2,U} + K_{2,1,T}C_{1,T} \quad (2)$$

$$C_3 = C_{3,K} + K_{3,1,T}C_{1,T} + K_{3,2,U}C_{2,U} \quad (3)$$

$$C_4 = K_{4,3,K}C_{3,K} + K_{4,2,U}C_{2,U} + K_{4,1,T}C_{1,T} \quad (4)$$

wherein Equations (1)–(4):
$C_j$ = the count rate measured in window j
j = 1, ..., 4;
$C_{j,k}$ = the count rate contribution in window j due only to activity from the element k(K=T,U,K);
$K_{i,j,k}$ = "stripping" constants defined as:

$$K_{i,j,k} = C_{i,k}/C_{j,k} \quad (5)$$

The constants $K_{i,j,k}$ are measured in "standard" borehole conditions surrounded by formations, each of which contains only K, only U, or only Th. The constants $K_{i,j,k}$ are, therefore, known calibration constants.

For standard borehole conditions, equations (1), (2), and (3) are solved for $C_{1,T}$, $C_{2,U}$, $C_{3,K}$ by $$C_{1,T} = C_1 \quad (6)$$

$$C_{2,U} = C_2 - (K_{2,1,T}C_{1,T}) \quad (7)$$

$$C_{3,K} = C_3 - (K_{3,1,T}C_1) - K_{3,2,U}(C_2 - K_{2,1,T}C_1) \quad (8)$$

where all terms on the right hand side of equations (6), (7) and (8) are either measured quantities ($C_1$, $C_2$, $C_3$) or the several known calibration constants ($K_{i,j,k}$). The relationship between $C_{j,k}$ and the corresponding elemental concentrations $M_K$, $M_U$ and $M_T$ will be discussed later.

In non-standard borehole conditions, the stripping constants $K_{i,j,k}$ measured in "standard" borehole conditions do not hold true if there is deviation from the standard configuration. Examples of stripping constants are shown in Table I for a selected group of Compton dominated energy ranges, with the "nonstandard" stripping constants, calculated using Monte Carlo techniques, being denoted by primes:

Tool Diameter: $3\frac{5}{8}''$ (centralized)

Standard Borehole: 10" F.W. (fresh water) Filled (with 38% porosity oil sand formation).

Non-Standard Borehole: 10", $5\frac{1}{2}''$ F.W.CSG (casing) + CMT (cement) (with 38% porosity oil sand formation).

TABLE 1

| Window # | Energy Range | Stripping Constants | |
|---|---|---|---|
| | | Standard $K_{i,j,k}$ | Nonstandard $K'_{i,j,k}$ |
| 1 | 2.0–3.0 MeV | $K_{2,1,T}$ = 0.118 | $K'_{2,1,T}$ = 0.130 |
| 2 | 1.6–2.0 MeV | $K_{3,1,T}$ = 0.157 | $K'_{3,1,T}$ = 0.235 |
| 3 | 1.1–1.6 MeV | $K_{4,1,T}$ = 0.357 | $K'_{4,1,T}$ = 0.529 |
| 4 | 0.5–1.1 MeV | $K_{3,2,U}$ = 0.406 | $K'_{3,2,U}$ = 0.388 |
| 5 | .15–0.5 MeV | $K_{4,2,U}$ = 0.647 | $K'_{4,2,U}$ = 0.951 |
| | | $K_{4,3,K}$ = 0.657 | $K'_{4,3,K}$ = 0.955 |
| | | $K_{5,1,T}$ = 0.864 | $K'_{5,1,T}$ = 1.029 |
| | | $K_{5,2,U}$ = 1.647 | $K'_{5,2,U}$ = 1.650 |

CORRECTION OF STRIPPING CONSTANTS FOR NON-STANDARD BOREHOLE CONDITIONS USING THE RESPONSE OF THE FOURTH WINDOW COUNT C4

There are three major parameters which affect the stripping constants as borehole and, to a lesser extent, formation conditions change. They are given by:

(a) $\eta \equiv \Sigma_\xi \rho_\xi \chi_\xi$ where $\rho_\xi$ and $\chi_\xi$ are the densities and effective thickness, respectively, of each intervening material $\xi$ such as borehole fluid, casing, and rock matrix between the detector within the sonde and the source of radiation;

(b) $E_k \equiv$ the primary gamma ray energy from element k (see FIG. 1);

(c) $\Delta E_{i,j} \equiv$ the difference in the midpoint of energy window j and energy window i (see FIG. 1).

The stripping constants $K_{i,j,k}$ obtained from a standard borehole at standard conditions must be corrected with functions of $\eta$, $E_k$ and $\Delta E_{i,j}$ to obtain correct stripped count rates $C_{1,T}$ and $C_{2,U}$ and $C_{3,K}$ in nonstandard boreholes. This operation can be expressed mathematically by rewriting Equations (1), (2) and (3).

$$C_{1,T} = C_1 \quad (9)$$

$$C_{2,U} = C_2 - [L(\eta)G_{2,1,T}(E_T, \Delta E_{2,1})]K_{2,1,T}C_1 \quad (10)$$

$$C_{3,K} = C_3 - [L(\eta)G_{3,1,T}(E_T, \Delta E_{3,1})]K_{3,1,T}C_1 - ([L(\eta)G_{3,2,U}(E_U, \Delta E_{3,2})]K_{3,2,U}(C_2 - [L(\eta)G_{2,1,T}(E_T, \Delta E_{2,1})]K_{2,1,T}C_1)) \quad (11)$$

Again, the terms $C_1$, $C_2$, and $C_3$ are measured values while the constants $K_{i,j,k}$ are known calibration constants measured under standard borehole conditions. From Equations (9), (10) and (11), the problem is to determine the unknown or remaining stripping function correction term $L(\eta)$ and $G_{i,j,k}(E_k, \Delta E_{i,j})$ where i, j, and k denote the same quantities as those used with the stripping constants $K_{i,j,k}$.

Figures 2, 2A:
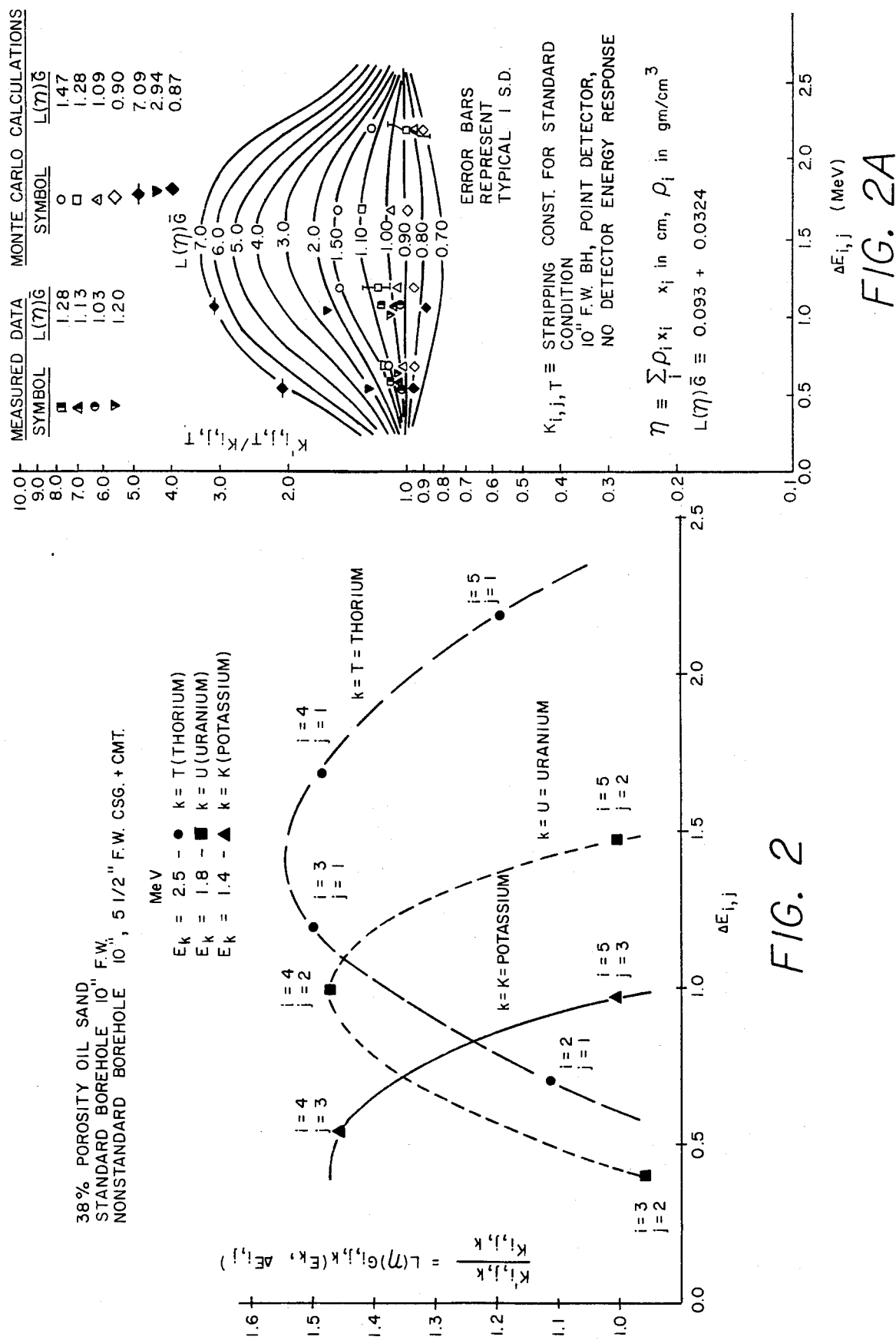
FIGS. 2 and 2A are graphical representations showing the effect on the stripping constants of borehole variation as a function of energy window placement.

Physically, the product $[L(\eta)G_{i,j,k}(E_k, \Delta E_{i,j})]K_{i,j,k}$ is simply a stripping constant for a nonstandard borehole condition, $K'_{i,j,k}$. Using the data in Table 1, the ratio $$K'_{i,j,k}/K_{i,j,k} = L(\eta)G_{i,j,k}(E_k, \Delta E_{i,j})$$

is plotted as a function of $\Delta E_{i,j}$ for k = T (thorium), k = U (uranium), and k = K (potassium) in FIG. 2.

From FIG. 2, it can be seen that the midpoint $E_k$ and widths of windows 1 through 4 were selected such that $L(\eta)G_{4,j,k}(E_k, \Delta E_{4,j})$ is essentially constant (= 1.47) for all values of j and k. This is important considering the fourth window (i = 4) is used as a "compensation" window to monitor the shape of the observed spectrum to thereby adjust the stripping constants for varying borehole conditions. This means that regardless of the relative concentrations of the K-U-T elements within the formation, the effects of the borehole on the stripping constant for each element will be reflected consistently in the fourth window. Mathematically, the effect can be seen as follows.

The count rate in window four, for any borehole condition is Equation (4) rewritten as:

$$C_4 = L(\eta)G_{4,1,T}(E_T, \Delta E_{4,1})K_{4,1,T}C_{1,T} + L(\eta) \cdot G_{4,2,U}(E_U, \Delta E_{4,2})K_{4,2,U}C_{2,U} + L(\eta)G_{4,3,K}(E_K, \Delta E_{4,3})K_{4,3,K}C_{3,K} \quad (12)$$

where the constants $K_{4,j,k}$ are stripping constant measured in the "standard" borehole conditions surrounded by formations each of which contains only K, only U, or only Th.

But from FIG. 2, we have seen that windows have been selected such that:

$$L(\eta)G_{4,j,k}(E_k, \Delta E_{4,j}) \approx \text{Constant} \quad (13)$$

for all values of j and element k for this particular nonstandard borehole. Although $L(\eta)$ will vary with changing borehole conditions, $G_{4,j,k}(E_k, \Delta E_{4,j})$ will remain constant since it is a function only of $E_k$ and $\Delta E_{4,j}$ which, of course, are fixed on defining the energy windows. We can then write equation (13) for any borehole condition as:

$$L(\eta)G_{4,j,k}(E_k, \Delta E_{4,j}) = L(\eta)\overline{G} \quad (14)$$

where $\overline{G}$ is a constant (1.47 in this instance). Substituting (14) into (12) yields $$C_4 = L(\eta)\overline{G}[K_{4,1,T}C_{1,T} + K_{4,2,U}C_{2,U} + K_{4,3,K}C_{3,K}] \quad (15)$$

FIG. 2A shows additional ratios $K'_{i,j,T}/K_{i,j,T}$ obtained from experimental data and Monte Carlo calculations using tool, borehole, and formation parameters such that $L(\eta)\overline{G}$ varied over a suitable range from 0.87 to 7.06. These data indicate that, within the limits of statistical accuracy, the products $L(\eta)G_{i,j,k}(E_k, \Delta E_{i,j})$ can be represented by an equation of the form:

$$L(\eta)G_{i,j,k}(E_k, \Delta E_{i,j}) = 1 + F(E_k, \Delta E_{i,j})m(L(\eta)\overline{G} - 1) \quad (16)$$

where $F(E_K, \Delta F_{i,j}) \equiv$ a function only of $E_k$ and $\Delta E_{i,j}$;

$m$ = a constant = +1 if $L(\eta)\overline{G} \geq 1.0$ and

= −1 if $L(\eta)\overline{G} \leq 1.0$

Fitting Equation (16) to the data shown in FIG. 2A gives:

$\eta \approx 0.8$ $F(E_T,\Delta E_{2,1}) \approx 0.22$ $$L(\eta)G_{2,1,T}(E_T,\Delta E_{2,1}) = 1 + 0.22m(L(\eta)\overline{G}-1)^{0.8} \text{ and}$$
$$F(E_T,\Delta E_{3,1}) = 0.50 \quad (17)$$

$$L(\eta)G_{3,1,T}(E_T,\Delta E_{2,1}) = 1.0 + 0.50m(L(\eta)\overline{G}-1)^{0.8} \quad (18)$$

Likewise, using uranium as a source, it can be shown that:

$F(E_U,\Delta E_{3,2}) = 0.08$ or $$L(\eta)G_{3,2,U}(E_U,\Delta E_{3,2}) = 1.0 + 0.08M(L(\eta)G-1)^{0.8} \quad (19)$$

Substituting Equations (17), (18), and (19) into Equations (9), (10), and (11) yields:

$$C_{1,T} = C_1 \quad (20)$$

$$C_{2,U} = C_2 - (1 + 0.22m(L(\eta)\overline{G}-1)^{0.8})K_{2,1,T}C_1 \quad (21)$$

$$C_{3,K} = C_3 - [(1+0.50m(L(\eta)\overline{G}-1)^{0.8})K_{3,1,T}C_1] - [(1+0.08(L(\eta)\overline{G}-1)^{0.8})K_{3,2,U}(C_2 - (1+0.50(L(\eta)\overline{G}-1)^{0.8})K_{2,1,T}C_1)] \quad (22)$$

These three equations, along with Equation (15), now give four equations and four unknowns namely $C_{1,T}$; $C_{2,U}1$; $C_{3,K}$; and $[L(\eta)\overline{G}]$; dependent on $C_1$, $C_2$, $C_3$, and $C_4$ (which are measured) and the constants $K_{i,j,k}$ which are known calibration constants.

For borehole conditions normally encountered, $0.5 < L(\eta)\overline{G} < 1.5$. For this range of $L(\eta)\overline{G}$, the expressions for $L(\eta)G_{i,j,k}(E_k,\Delta E_{i,j})$ can be approximated, with good accuracy, by rewriting Equations (17), (18) and (19) as:

$$L(\eta)G_{2,1,T}(E_T,\Delta E_{2,1}) \approx 1 + 0.27(L(\eta)\overline{G}-1) \quad (17a)$$

$$L(\eta)G_{3,1,T}(E_T,\Delta E_{3,1}) \approx 1 + 0.57(L(\eta)\overline{G}-1) \quad (18a)$$

$$L(\eta)G_{3,2,U}(E_U,\Delta E_{3,2}) \approx 1 + 0.08(L(\eta)\overline{G}-1) \quad (19a)$$

yielding in Equations (20), (21), and (22):

$$C_{1,T} \approx C_1 \quad (20a)$$

$$C_{2,U} \approx C_2 - (1 + 0.27(L(\eta)\overline{G}-1))K_{2,1,T}C_1 \quad (21a)$$

$$C_{3,K} \approx C_3 - [1 + 0.57(L(\eta)\overline{G}-1))K_{3,1,T}C_1] - [(1+0.08(L(\eta)\overline{G}-1))K_{3,2,U}(C_2 - (1+0.27(L(\eta)\overline{G}-1))K_{2,1,T}C_1)] \quad (22a)$$

Note that in standard borehole conditions $L(\eta)G_{i,j,k} = 1$, and this is reflected in Equation (16).

Figure 3:
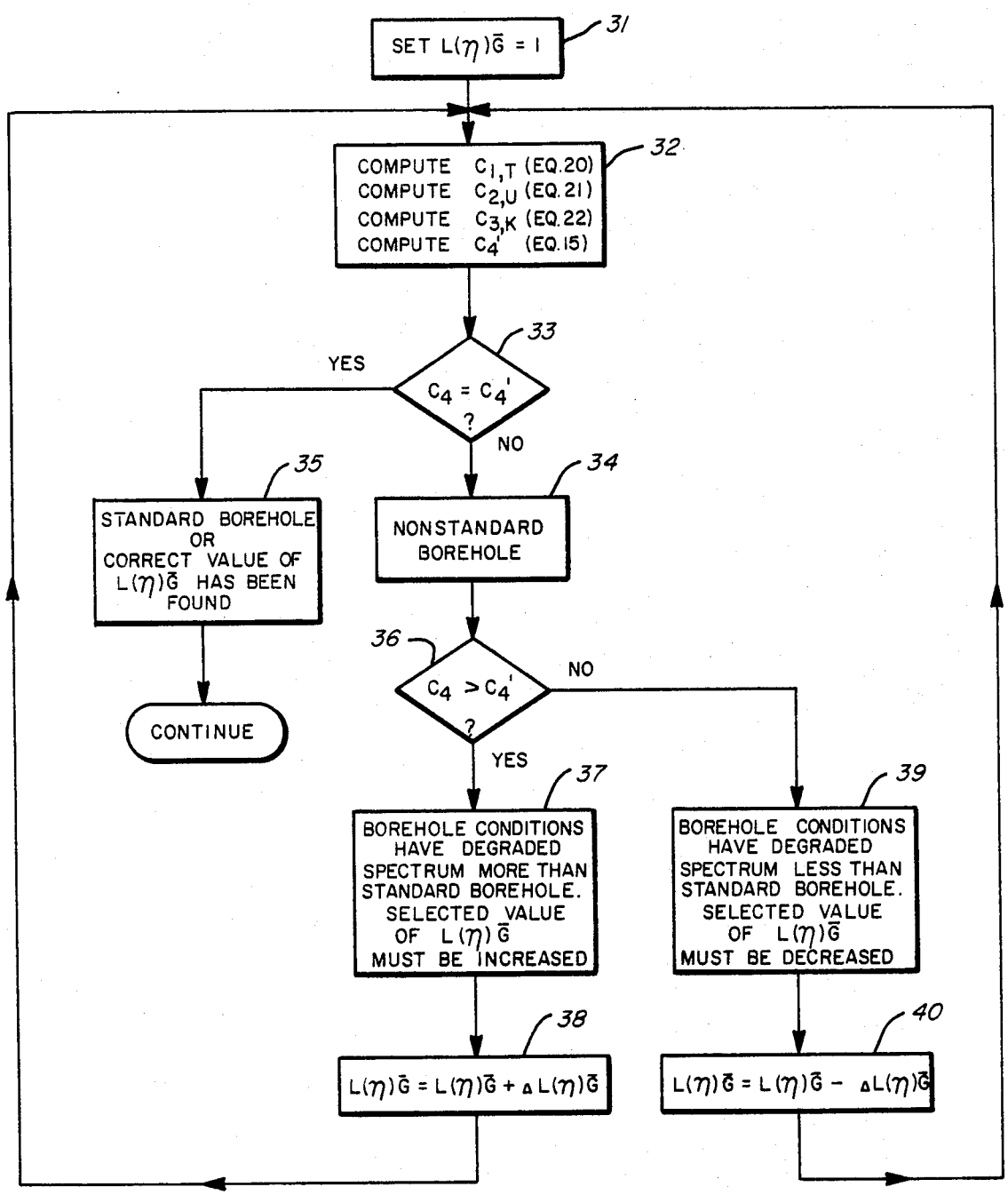
FIG. 3 is a flow chart illustrating a computer implemented method of determining a borehole compensation parameter.

The solution of the four simultaneous equations (that is, (16) to (19) inclusive) is time consuming. There is, however, an iteration technique which could also be used to obtain approximate real time solutions in logging operations. A flow chart or logic flow of the solution is shown in FIG. 3. Of course, with a computer with sufficient speed, the analytical solution can be used rather than the iterative approach described hereinafter.

Upon entry into the iteration technique scheme at logic block 31, the function $L(\eta)\overline{G}$ is set initially equal to 1.0 as a first guess (i.e. a value corresponding to standard borehole conditions). Control is then transferred to logic block 32 where computations of $C_{1,T}$, $C_{2,U}$ and $C_{3,K}$ are made using Equations (20), (21), and (22) respectively. Substituting these variables, together with the assumed value of $L(\eta)\overline{G}$ into Equation (15) results in a calculation of the expected count rate $C_4'$ obtained from window 4 ($C_4'$ replaces $C_4$ in the equation to denote a calculated rather than a measured value). Control is then transferred to logic block 33 where a comparison test is made to determine if the computed $C_4'$ is about equal to the observed fourth window count rate $C_4$. If $C_4$ and $C_4'$ are within some preselected value $\Delta C_4$ of each other, then the iteration scheme is complete and control is transferred to logic block 35 where the correct value of $L(\eta)\overline{G}$ is output. If the test at block 33 does not pass, then non-standard borehole conditions are being encountered as indicated at logic block 36 where a second test to determine if $C_4 > C_4'$. If $C_4 < C_4'$ then control is transferred to block 37 where (at block 38) the function $L(\eta)\overline{G}$ is increased. If $C_4 < C_4'$ then control is transferred to logic blocks 39 and 40 where the function $L(\eta)\overline{G}$ is decreased. Exit from either logic block 38 or 40 is to loop back to block 32 where another iteration is begun with the updated value of the function $L(\eta)\overline{G}$. In this manner, the function $L(\eta)\overline{G}$, for the particular borehole conditions being encountered may be determined.

The rate at which the solution converges can be seen with the following exemplary well:

EXAMPLE=a fresh water filled 5½" casing in a 10" borehole with annular cement:

| | |
|---|---|
| $C_1 = 1.7$ | These observed count rates are in |
| $C_2 = 1.14$ | arbitrary units but the relative |
| $C_3 = 2.87$ | elemental proportions are typical of |
| $C_4 = 3.80$ | those observed in an average kaolinite having 13 ppm of Th, 2 ppm of U, and 0.42% K; | setting $\Delta L(\eta)\overline{G} = 1.0$ for a standard 10" open borehole filled with fresh water for which stripping constants are:

| $K_{2,1,T} = 0.118$ | | $K_{4,1,T} = 0.357$ | | |
|---|---|---|---|---|
| $K_{3,1,T} = 0.157$ | | $K_{4,2,U} = 0.647$ | | |
| $K_{3,2,U} = 0.406$ | | $K_{4,3,K} = 0.657$ | | |
| $L(\eta)G$ | $C_{1,T}$ | $C_{2,U}$ | $C_{3,K}$ | $C_4'$ | $C_4$ |
| 1.00 | 1.7 | 0.939 | 2.222 | 2.674 | 3.80 |
| 1.10 | 1.7 | 0.934 | 2.197 | 2.921 | 3.80 |
| 1.20 | 1.7 | 0.928 | 2.171 | 3.160 | 3.80 |
| 1.30 | 1.7 | 0.923 | 2.146 | 3.398 | 3.80 |
| 1.40 | 1.7 | 0.918 | 2.122 | 3.633 | 3.80 |
| 1.50 | 1.7 | 0.912 | 2.096 | 3.832 | 3.80 |

Therefore, $L(\eta)\overline{G} = 1.47$ as the iterations converge.

In many applications, iteration on each subsequent data set may conveniently begin in block 31 assuming as an initial value the $L(\eta)\overline{G}$ obtained as a result of convergence on prior data set(s). In intervals of constant or slowly changing borehole conditions, this will result in more rapid convergence than if standard conditions were initially assumed.

CONVERSION OF $C_{1,T}$ and $C_{2,U}$ and $C_{3,K}$ TO ELEMENTAL CONCENTRATIONS The stripped count rates $C_{i,k}$ are converted to the corresponding elemental concentrations $M_k$ using the relationship:

$$M_k = C_{i,k}/B(\eta)Q_k \tag{23}$$

where $Q_k$ (k=T,U,K) = calibration constants measured with the tool in a *standard borehole* surrounded by one of three formations containing known cocentrations of only Th, only U, or only K;

$B(\eta)$ = a term which normalizes the calibration constants $Q_k$, which were measured using standard borehole conditions, to borehole which are non-standard.

Monte Carlo calculations have shown that, to a good approximation, $\eta$ can be computed from $L(\eta)\overline{G}$ (which is obtained in the previously described iteration process) using the equation:

$$\eta = (L(\eta)\overline{G} - 0.093)/0.0324 \tag{24}$$

Note that the standard borehole $L(\eta)\overline{G} = 1$ and $\eta = 28$. Also, Monte Carlo calculations show that the function form of $B(\eta)$ can be approximated by:

$$B(\eta) = 6.91 \exp(-0.01 + 0.001\eta^2) \tag{25}$$

To summarize, $M_k$ is computed from the corresponding stripped count rate $C_{i,k}$ as follows:
(a) $L(\eta)\overline{G}$ is obtained from the previously described iteration technique or direct solution of the set of four equations;
(b) $\eta$ is computed from Equation (24) using $L(\eta)\overline{G}$;
(c) $B(\eta)$ is computed from Equation (25) using $\eta$; and
(d) $M_k$ is computed from Equation (23) using $B(\eta)$ and the appropriate stripped count rate $C_{i,k}$.

The improvement in accuracy of the resulting $M_k$ values in non-standard boreholes can be demonstrated by again using hypothetical Monte Carlo data computed in a standard and non-standard borehole.

For a (non-standard) 10" borehole containing a 5½" fresh water filled casing and a cement annulus, the borehole compensated stripped count rates are:

$$C_{1,T}=1.7,\ C_{2,U}=0.92,\ C_{3,K}=2.11 \tag{26}$$

with an iterated value of $L(\eta)\overline{G} = 1.47$. Using Equation (24), one obtains $$\eta = 42.5 \tag{27}$$

Using Equation (25) and the result of (27) yields:

$$B(\eta) = 0.599 \tag{28}$$

For the purposes of this hypothetical demonstration, assume:

$$Q_k = 1 \text{ for } K=T,\ U,\text{ and } K \tag{29}$$

Substituting the values from Equations (29), (28) and (26) into Equation (23) yields:

$$M_T = 2.83,\ M_U = 1.54,\ M_K = 3.52 \tag{30}$$

Monte Carlo calculations using the standard borehole geometry with identical elemental concentrations yielded values of:

$$M_T = 2.80,\ M_u = 1.52,\ M_k = 3.65 \tag{31}$$

thereby indicating good agreement.

APPLICATION OF BOREHOLE COMPENSATION TECHNIQUE TO GAMMA RAY SPECTRA ANALYZED BY THE METHOD OF LEAST SQUARES FITTING

Assuming standard borehole conditions, $N_i$, the total number of gamma ray counts in energy channel i having a midpoint in gamma radiation energy band $E_i$, is given by:

$$N_i = \Sigma_k W_k N_{i,k} \tag{32}$$

where $N_{i,k}$ = number of gamma ray counts in energy channel i from the spectrum of element k, measured in standard borehole conditions (the "library" spectrum);

$W_k$ = a term proportional to the concentration of element k within the formation.

The terms of interest $W_k$ (related to the elemental concentrations) are determined using the least square criterion:

$$\sum_i (\overline{N}_i - N_i)^2 = \text{MINIMUM VALUE} \tag{33}$$

where $\overline{N}_i$ = the number of gamma ray counts observed in energy channel i.

When non-standard borehole conditions are encountered, the standard or "library" spectra counts $N_{i,k}$ must be modified by $$N'_{i,k} = L(\eta)G(E_i)N_{i,k} \tag{34}$$

where $N'_{i,k}$ = the library spectra counts in channel i from element k for non-standard borehole conditions;

$G(E_i)$ = a term which is a function of the gamma ray energy $E_i$ recorded in the mid-point of energy channel i. Again, using the least-square criterion:

$$\Sigma_i(\overline{N}_i - N'_i)^2 = \text{MINIMUM VALUE} \tag{35}$$

where $$N'_i = \Sigma_k W_k N'_{i,k} \tag{36}$$

The terms $G(E_i)$ can be computed or measured. Therefore, the set of equations generated by the least squared criterion can be solved for $W_k$ and $L(\eta)$.

Elemental concentrations, $M_k$, are then computed from:

$$M_k = W_k/B(\eta)Q_k' \tag{37}$$

where $Q_k'$ = calibration constants measured with the tool in a standard borehole surrounded by one of three formations containing known concentrations only Th, only U, or only K.

For Equation (37), $B(\eta)$ and $\eta$ are given by Equations (25) and (24), respectively.

Definition of the Fifth and Sixth Energy Windows Shown in FIG. 1

The gamma ray energy spectrum of FIG. 1 was separated into six energy windows. The upper four windows were discussed hereinabove. The fifth window is located such that gamma radiation which is susceptible to attenuation primarily only through Compton scattering is detected therein, and also preferably low enough in energy that discernable spectral differences are not apparent for different sources (K-U-T). It encompasses a higher energy range relative to that in the sixth window, which is designed to emphasize photoelectric absorption effects in formation matrix elements. The fifth window is, therefore, selected where the attenuation is primarily due to Compton scattering, while the sixth window is selected in an energy range where photoelectric absorption from formation matrix elements such as calcium, silicon, and magnesium is significant. The count rate relationships in windows 5 and 6 of FIG. 1 are given by Equations (38) and (39):

$$C_5 = f(M_T, M_U, M_K, \eta) \quad (38)$$

$$C_6 = f(M_T, M_U, M_K, \eta, P) \quad (39)$$

In these equations, the concentrations of the K-U-T elements are common factors in both relationships. In addition, the attenuation $\eta$ is common to both relationships. The photoelectric attenuation factor P is discussed below.

The probability of gamma ray photoelectric absorption in a material is related both to the energy $(E\gamma)$ of the gamma ray and the atomic numbers $(Z)$ of the elements present. If this probability is expressed as a microscopic absorption cross-section, $\sigma$, then for element i:

$$\sigma_i = C \cdot \frac{Z_i^{4.6}}{E_\gamma^3}, \quad C = \text{constant} \quad (40)$$

For a given gamma energy, this can be reduced to:

$$\sigma_i = K Z_i^{4.6} \quad (41)$$

K is a constant for a given gamma ray energy.

For a molecule j composed of $n_i$ atoms of element $Z_i$, then the microscopic molecular cross section is given by:

$$\sigma_j = K \sum_i n_i Z_i^{4.6} \quad (42)$$

If N represents the number of molecules per unit volume of a molecular material, then the total macroscopic photoelectric absorption cross section per unit volume (U) for a material is given by $$U = KN \left( \sum_i n_i Z_i^{4.6} \right) \quad (43)$$

For sand, dolomite, and limestone U values for approximately 30 KeV gamma rays are 4.80 cm$^{-1}$, 8.97 cm$^{-1}$, and 13.76 cm$^{-1}$ respectively. Hence it can be seen that U is substantially different for these rock matrices at low gamma energies.

For a composite earth formation containing porosity $\phi$, the composite $U_{FM}$ is given by:

$$U_{FM} = (1-\phi)U_{MA} + \phi U_F, \quad (44)$$

where $U_{MA}$ and $U_F$ are the U values for the matrix and fluid respectively.

If the path followed by low energy scattered gamma rays from the source in the formation to the detector in the tool intersects several materials, j, each having photoelectric absorption cross section $U_j$, then the total photoelectric attenuation factor, P, prior to detection is given by:

$$P = \sum_j x_j U_j, \quad (45)$$

where $x_j$ is the average path length traveled by the gamma rays in traversing material j between the source and detector.

A ratio R of the observed gamma ray count rates in windows 6 and 5 can be obtained by combining equations (38) and (39):

$$R = \frac{f(M_{TH}, M_U, K, \eta, P)}{f(M_{TH}, M_U, M_K, \eta)} \quad (46)$$

In light borehole mud environments and relatively good borehole conditions, the borehole terms and formation fluid terms in (46) are small relative to the formation matrix terms $(x_{FM}U_{MA}(1-\phi))$. In many applications, spectral effects due to the relative source concentrations $(M_{TH}, M_U, M_K)$ are similar in windows 5 and 6, and hence R is not strongly affected by source type. In these instances $$U_{ma} = f''(R) \quad (47)$$

Hence the ratio R can be used directly to indicate formation lithology.

If borehole terms are not negligible, then $$U_{ma} = f''' \quad (48)$$

(R, mudweight, caliper); and predetermined computer implemented corrections to the observed ratio R can be used, based on mud weight information and borehole size information from the caliper.

Figure 5:
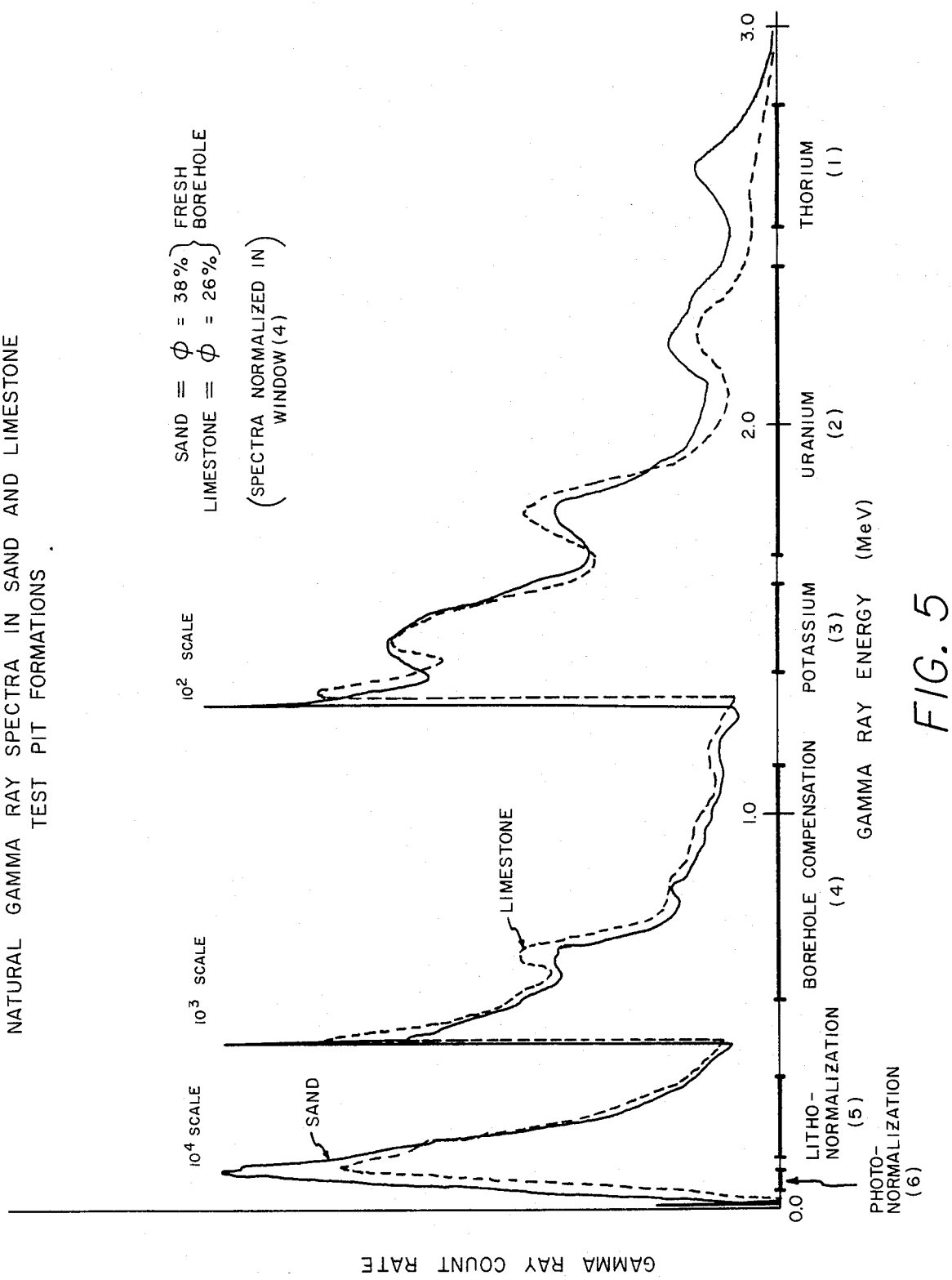
FIG. 5 is an overlay of natural gamma ray spectra with similar K-U-T concentrations in sand and limestone formations.

The sensitivity of observed natural gamma spectra at low energies to different formation lithology types can be seen in FIG. 5. This figure shows spectra in test pit sand and limestone formations having somewhat similar natural gamma source distributions. Observe that at low energies there is a markedly greater attenuation of the observed gamma rays in the limestone formation, which has higher $U_{ma}$. From this figure it is apparent that a ratio R, using the windows shown in the figure, will be sensitive to lithology. The ratio also serves to normalize differences in source strength in the different formations.

Figure 6:
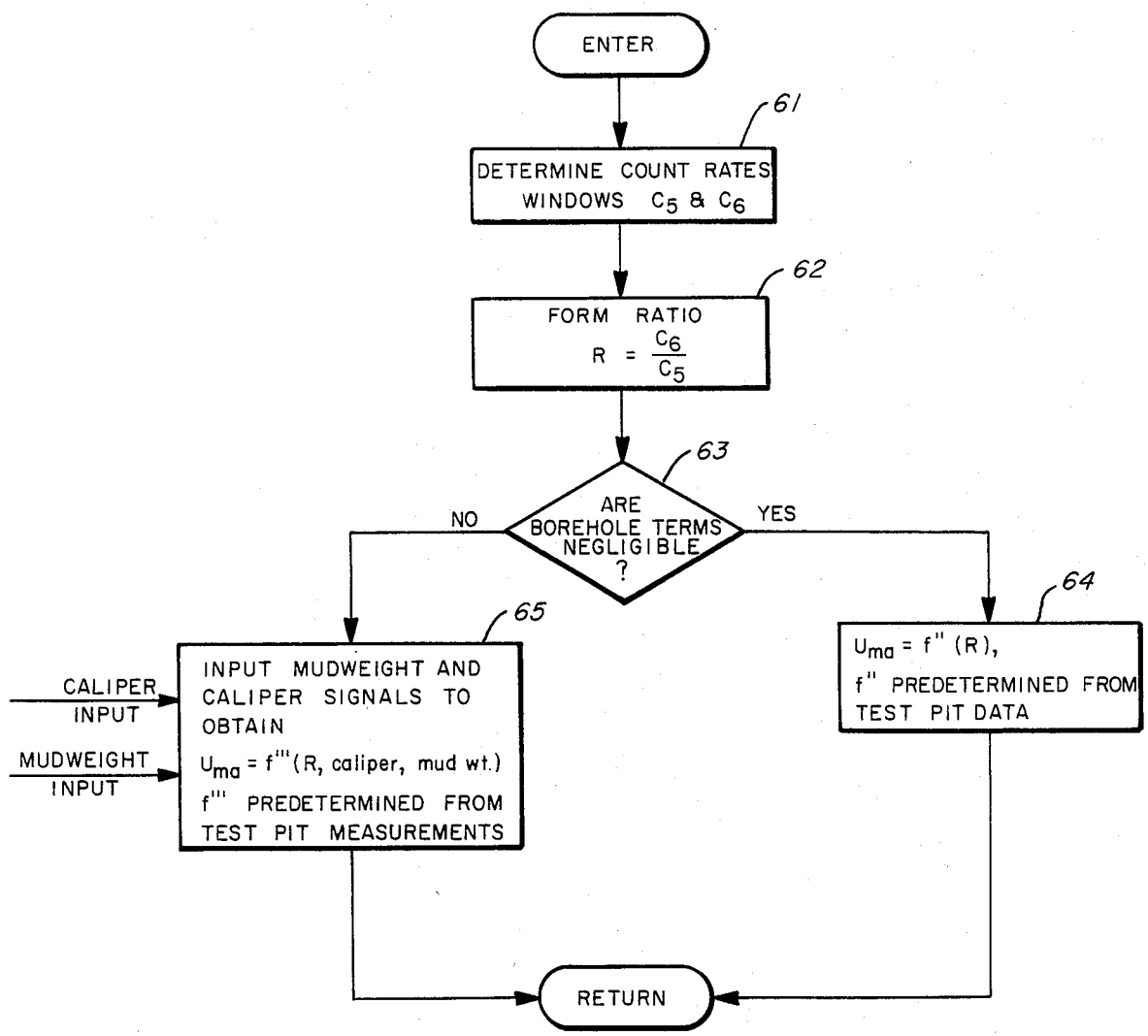
FIG. 6 is a flow chart illustrating the manner of determining the formation matrix type indicator.

Referring now to FIG. 6, a flow chart of the process for deriving the measurement of formation matrix type ($U_{ma}$) is shown in more detail. The computer 54 of FIG. 1 may be programmed according to the flow chart of FIG. 6 to derive the lithology indicator just discussed as follows.

Control is transferred to the program of FIG. 6 periodically from the main control program of the computer 54 of FIG. 1. For example, on a time or depth basis, the main control program of computer 54 enters the subroutine program of FIG. 6 to compute the formation matrix type indicator as a function of borehole depth. At logic block 61 the routine determines the count rates in energy windows 5 and 6 of FIG. 5 and control is transferred to logic block 62 where the ratio R is determined as indicated.

Control is then transferred to logic block 63 where a test is performed to determine if borehole terms are negligible. If the borehole terms are negligible, control is passed to logic block 64 where the function $U_{ma}$ is computed according to equation (47). If borehole terms are not negligible as indicated by the test at block 63, then control is transferred to logic block 64 where caliper and mudweight data from the memory of computer 54 of FIG. 1 are utilized to determine $U_{ma}$ according to equation (48). In either event control is then returned to the main control program of the computer 54 of FIG. 1 and the lithology indicative parameter $U_{ma}$ is displayed as a function of borehole depth.

WELL LOGGING SYSTEM

Referring now to FIG. 4, a well logging system in accordance with the concepts of the present invention is illustrated schematically. An uncased well borehole 41 penetrates earth formation 46. The borehole 41 contains a well bore fluid 42 to control pressure in subsurface formations. Suspended in the borehole 41 by an armored well logging cable 54 is a sonde 43 containing instrumentation for measuring gamma ray spectral characteristics of the earth formations 46 penetrated by the borehole 41. The sonde 43 contains a low atomic number pressure housing, such as the one described in U.S. patent filed June 16, 1982, Ser. No. 388,844. Signals from the downhole sonde 43 are conducted to the surface on conductors of the cable 56 and supplied to a surface computer 54 which performs the hereinbefore described signal processing techniques in order to extract the elemental constituents of potassium, uranium and thorium present in the earth formations 46 which are then recorded as a function of borehole depth on the recorder 55. The well logging cable 56 passes over a sheave wheel 44 which is electrically or mechanically coupled (as indicated by a dotted line 45) to the computer 54 and recorder 55 in order to provide depth information about the downhole sonde 43 for the surface recording process. The surface computer 54 may be a model PDP-11 provided by Digital Equipment Corp. of Cambridge, Mass. and can be programmed in a high level language such as FORTRAN to perform the previously described computations and to drive the output displays.

The downhole sonde 43 contains, near the lower end thereof, a gamma ray detecting system comprising a scintillation crystal 47 and a photomultiplier and amplifier package 48, and may include a gain stabilization circuit. Power for the operation of the downhole sonde system is supplied from a surface power supply 53 via conductors of the cable 56 to a downhole power supply 51 where it is converted to appropriate voltage levels and supplied to the downhole circuitry components of the system as indicated in FIG. 4. Gamma ray spectral signals are supplied from the photomultiplier system 48 to a pulse height analyzer 49 where they are separated into count rates in the six energy windows hereinbefore described. The pulse height analyzer provides the six output signals corresponding to the count rates in each of the energy windows herein described to a telemetry system 50 where the pulse height gamma ray spectral information is converted to an appropriate wave form for transmission to the surface via conductors of the well logging cable 56. Downhole control circuits 51 provide timing pulses to the pulse height analyzer and telemetry system in order to synchronize the transmission at regular data intervals from the downhole sonde 43 to the surface equipment. These synchronization signals are also encoded in the telemetry system 50 and supplied to the surface computer 54.

Thus, naturally occurring gamma rays from the earth's formations 46 are detected by the scintillation crystal 47, photomultiplier detector system 48 in the downhole sonde 43, broken down into their energy constituents by the pulse height analyzer 49 and telemetered to the surface by the telemetry system 50 on conductors of the armored well logging cable 56. At the surface, the signals are processed in accordance with the hereinbefore described techniques in order to extract the radioactive elemental constituency of earth formations 46 penetrated by the borehole 41, and to discern formation matrix type.

The foregoing description may make other alternative arrangements according to the concepts of the present invention apparent to those skilled in the art.

I claim:

1. A method of natural gamma ray spectral well logging to determine the formation matrix type or lithology of earth formation penetrated by a well borehole, comprising the steps of:

passing a fluid tight hollow well logging sonde, sized and adapted for passage in a well borehole, through earth formations penetrated by a well borehole, said sonde containing a scintillation type radiation detector and an associated photomultiplier, and obtaining therefrom a gamma ray energy spectrum of naturally occurring gamma rays emitted by the earth formations;

separating said gamma ray energy spectrum into at least two separate energy regions, an upper energy region and a lower energy region, said upper energy region being selected such that gamma radiation detected therein is comprised essentially of naturally occurring gamma rays attenuated primarily by Compton scattering in the earth formations and said lower energy region being selected such that gamma radiation detected therein is comprised essentially of naturally occurring gamma rays attenuated significantly by photoelectric absorption in the earth formations; and deriving from a function of the number of gamma rays occurring in said upper and lower energy regions an indicator of the lithology of the earth formation.

2. The method of claim 1 wherein said function is a ratio of the counts in said energy regions.

3. The method of claim 2 wherein the steps are repeated at different depth levels in a well borehole and said lithology indicative ratio is recorded as a function of borehole depth.

4. The method of claim 1 wherein said upper energy region includes the range from approximately 135 KeV to approximately 325 KeV and said lower energy region includes the range from approximately 25 KeV to approximately 80 KeV.

5. The method of claim 2 wherein the functional relationships used in deriving lithology from said ratio are predetermined empirical relationships obtained from test pit measurements in naturally radioactive formations having known lithology characteristics.

6. The method of claim 5 wherein different functional relationships are used, derived in a like manner, for conditions where borehole effects on said lithology indicator are negligible or non-negligible.

7. The method of claim 1 wherein the step of obtaining the gamma ray spectrum is performed with said fluid tight hollow sonde having a low atomic number housing in the vicinity of said scintillation detector.

8. A method of determining elemental concentrations and formation matrix type of earth formations penetrated by a well borehole, comprising the steps of:

passing a fluid tight hollow well logging sonde sized and adapted for passage in a well borehole through earth formations penetrated by a well borehole, said sonde containing a scintillation type radiation detector and an associated photomultiplier and obtaining therefrom a gamma ray energy spectrum of naturally occurring gamma rays emitted by the earth formations;

separating said gamma ray energy spectrum into at least six separate energy regions, a first energy region associated with gamma rays emitted by naturally occurring radioactive thorium isotopes, a second lower energy region associated with gamma rays emitted from naturally occurring radioactive uranium isotopes, a third still lower energy region associated with gamma rays emitted from naturally occurring radioactive potassium isotopes, a fourth still lower energy region for monitoring the overall shape of the gamma ray spectrum as a function of borehole conditions, a fifth still lower energy region selected such that gamma radiation detected therein is comprised essentially of naturally occurring gamma radiation attenuated primarily by Compton scattering in the earth formations and a sixth, still lower, energy region being selected such that gamma radiation detected therein is comprised essentially of naturally occurring gamma radiation attenuated significantly by photoelectric absorption in the earth formations;

deriving from said gamma ray spectrum elemental concentrations of naturally occurring thorium, uranium and potassium isotopes in the earth formations corrected for borehole effects by a functional relationship derived from said fourth energy region gamma ray measurements;

deriving from a function of the number of gamma rays occurring in said fifth and sixth energy regions an indicator of the lithology of the earth formations.

9. The method of claim 8 wherein said function is a ratio of the counts in said energy regions.

10. The method of claim 9 wherein the steps are repeated at different depth levels in a well borehole and said elemental concentrations and said lithology indicator are recorded as a function of borehole depth.

11. The method of claim 9 wherein said fifth energy region includes the interval from approximately 135 KeV to approximately 325 KeV and said sixth energy region includes the interval from approximately 25 KeV to approximately 80 KeV.

12. The method of claim 9 wherein the functional relationships used in deriving lithology from said ratio are predetermined empirical functions determined from test pit measurements in formations having known lithology characteristics.

13. The method of claim 12 wherein different functional relationships are used, derived in a like manner, for conditions where borehole effects on said lithology indicator are negligible or non-negligible.

14. The method of claim 8 wherein the step of obtaining the gamma ray spectrum is performed with said fluid tight hollow sonde having a low atomic number housing in the vicinity of said scintillation detector.

* * * * *